United States Patent Office

3,660,375
Patented May 2, 1972

3,660,375
β - CRYSTAL MODIFICATION OF 4,4' - BIS-
(α - ANTHRAQUINONYLAMINOCARBONYL)-
AZOBENZENE PIGMENT
Klaus Ehrhardt, Basel, Georg Geiger, Reinach, Basel-Land, and Fritz Kehrer, Basel, Switzerland, assignors to Sandoz Ltd., Basel, Switzerland
Filed Jan. 8, 1970, Ser. No. 1,338
Claims priority, application Switzerland, Jan. 14, 1969, 415/69
Int. Cl. C09b 67/00
U.S. Cl. 260—207.1                                    1 Claim

ABSTRACT OF THE DISCLOSURE

In pigment application, especially in the pigmentation of plastic materials, the β-modification of 4,4'-bis-(α-anthraquinonylaminocarbonyl)azobenzene exhibits substantially better properties than the known α-crystal modification. The β-crystal form is prepared by grinding the α-modification at temperatures in excess of 100° C.

Figure 1:
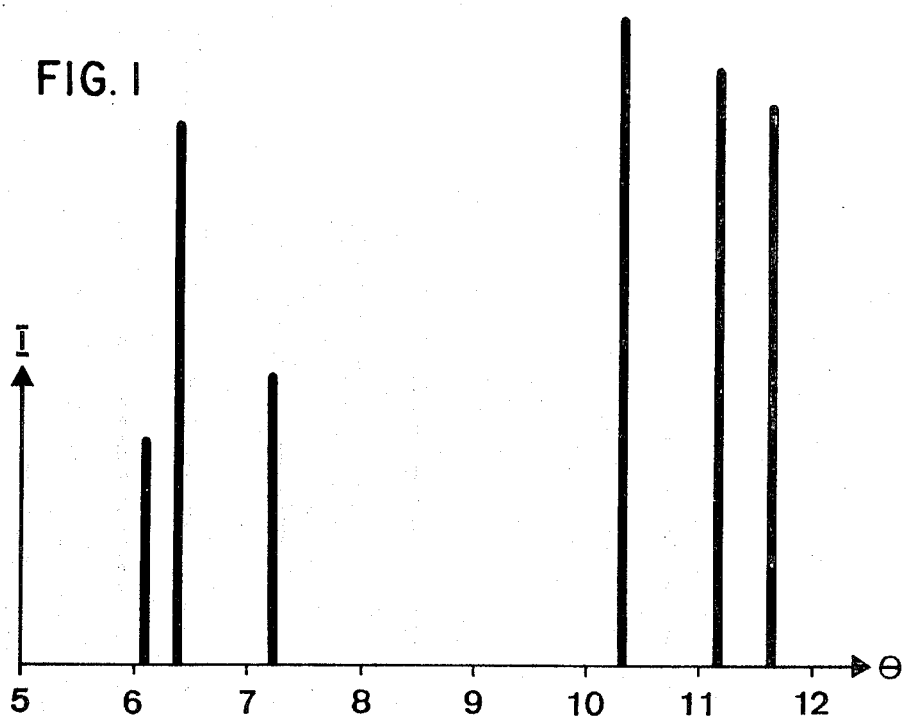

This invention relates to the β-modification of 4,4'-bis-(α-anthraquinonylaminocarbonyl)-azobenzene, which in pigment applications, especially in the pigmentation of plastic materials, exhibits substantially better properties than the known α-crystal modification.

It has been found that the β-crystal modification of the pigment of the formula

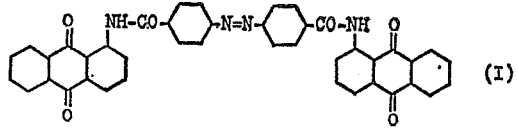

(I)

which is characterized by three specific lines in the X-ray spectrum (Cu—$K_{a1}$ radiation) at an angle of diffraction of 10–12° has considerably more valuable pigmentary properties than the known α-modification, which in Cu—$K_{a1}$ raidation has an X-ray spectrum showing a characteristic line at an angle of diffraction of approximately 8.4° (θ according to Bragg).

The method of producing the pigment of Formula I is known and is described, inter alia, in U.S. Pat. 2,228,-455. The transformation of the α-modification thus formed into the β-crystal form of the present invention is effected by grinding at temperatures in excess of 100° C., preferably at 150° to 180° C.

The treatment is carried out preferably in the presence of grinding assistants, in particular inert inorganic salts, e.g. common salt, Glauber's salt, calcium ferrocyanide or calcium carbonate. On completion of grinding these assistants are washed out with water, while any abraded iron present is removed, if necessary, with dilute acids. Grinding generally takes from 5 to 100 hours, or more particularly 40 to 60 hours, and can be carried out in any of the machines normally used for this purpose, including ball and roller mills and vibratory grinding equipment.

The pigment thus obtained, in comparison with the unground pigment and the same pigment ground at a lower temperature, is notable by reason of its enhanced brilliance and greater tinctorial strength. It is virtually insoluble in the commonly used organic solvents. Its rheological properties are very good. Suitable applications include dyeing of paper in the stock, the pigmentation of plastics in mass, by which are understood materials, which may be dissolved, containing plastics or synthetic resins, and of natural resins and rubber, and the printing of textiles and paper.

On these substrates, to which it is applied in accordance with known methods, the pigment shows outstandingly good fastness to light, washing, chlorite, hypochlorite and peroxide bleaching, hydrosulphite, cross dyeing, blind vats, dry cleaning, rubbing, overlacquering and solvents. The heat stability and transparency are good.

In the following examples the parts and percentages are by weight and the temperatures are given in degrees centigrade.

EXAMPLE 1

75 parts of the pigment of Formula I, obtained in accordance with Example 1 of U.S. Pat. 2,228,445, are entered, along with 600 parts of dry common salt, into an iron ball mill equipped with iron balls of about 2.5 cm. diameter totalling 7000 parts and an iron chain. In about 3 hours the mixture in the mill is raised to 150° by an external air bath and is then ground for 48 hours at about 90 r.p.m. and an air bath temperature of 150°. The iron balls are separated from the mixture and this is stirred into water, after which the pigment is filtered off and washed free of residual salt.

If an excessive amount of iron is ground off from the equipment during the process, it can be dissolved out of the aqueous pigment suspension with a hydrochloric acid solution of about 5% strength. For further purification the pigment can be treated with Javelle water in the normal way. After a final wash with distilled water, the pigment is vaccum dried at 60–90° and ground again, e.g. in a pin disk mill.

A pale yellow powder is obtained which pigments polyvinyl chloride in brilliant greenish yellow shades.

If the starting product is suspended in a solvent, e.g. acetone, and ground at room temperature, it yields a pigment exhibiting duller and reddish yellow shades in polyvinyl chloride.

The pigment ground under the action of heat, i.e. the β-crystal modification, is distinguished from the unground pigment and the α-crystal modification formed by grinding at room temperature, by the presence of three specific lines in its X-ray spectrum (Cu—$K_{a1}$ radiation) at an angle of diffraction of 10 to 12°. The unground pigment and the pigment ground at ambient temperature do not differ from each other in their X-ray spectra, each having a line at a diffraction angle of approximately 8.4°, which is absent in the spectrum of the pigment of this invention.

EXAMPLE 2

A mixture of 10 g. of the starting pigment as used in Example 1 and 100 g. of dry common salt is charged on to an iron triple roll mill of about 1.2 litres capacity, each of the three rolls being about 4 cm. in diameter and weighing about 1.3 kg. After an air bath has raised the mixture to 180° it is ground at this temperature for 60 hours at approximately 85 r.p.m., and subsequently it is worked up as described in Example 1. A pale yellow powder is obtained which has exactly the same properties as the final pigment of Example 1.

Figure 2:
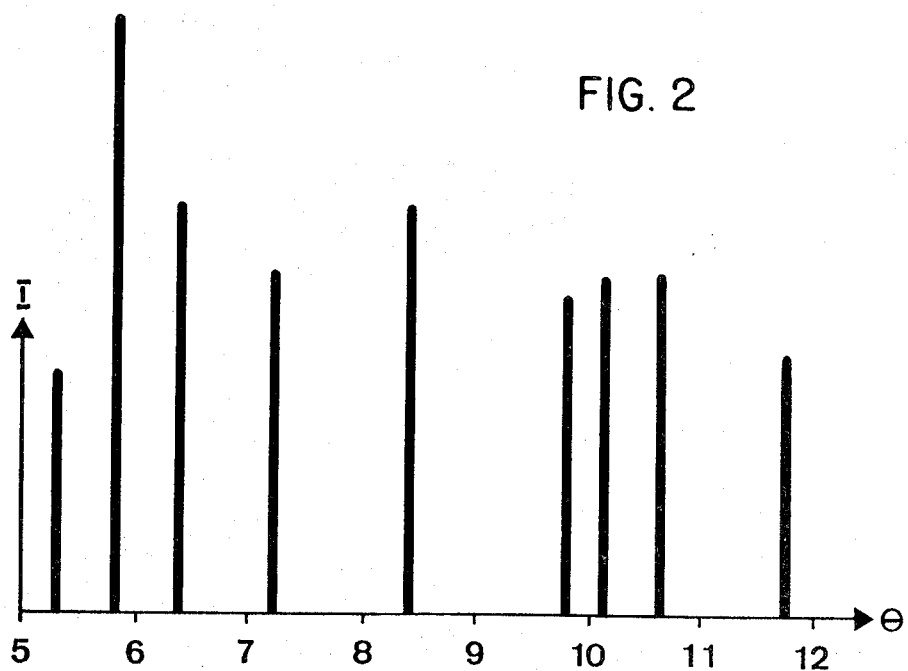

FIG. 1 shows the X-ray spectrum of the β modification and FIG. 2 that of the α-modification. The intensity of the lines is plotted on a relative scale and the Bragg angle of diffraction θ is given in degrees.

Within tolerable limits the relevant data are:

β-MODIFICATION

| Bragg angle of diffraction θ (degrees): | Intensity |
|---|---|
| 6.1 | 16 |
| 6.4 | 37.5 |
| 7.2 | 20 |
| 10.33 | 45 |
| 11.2 | 41 |
| 11.6 | 39 |

α-MODIFICATION

| Bragg angle of diffraction θ (degrees): | Intensity |
|---|---|
| 5.3 | 17 |
| 5.85 | 41 |
| 6.4 | 28 |
| 7.2 | 24 |
| 8.4 | 28 |
| 9.8 | 22 |
| 10.1 | 23 |
| 10.6 | 24 |
| 11.75 | 18 |

Having thus disclosed the invention, what we claim is:

1. The (β-crystal modification of 4,4'-bis-(α-anthraquinonylaminocarbonyl)azobenzene pigment) lacking the characteristic X-ray spectrum (Cu—$K_{\alpha 1}$ radiation) line for the corresponding α-crystal modification at an angle of diffraction of approximately 8.4° and characterized by three specific lines in the X-ray spectrum (Cu—$K_{\alpha 1}$) at angles of diffraction of approximately 10.33°, 11.2° and 11.6°.

References Cited
UNITED STATES PATENTS

| | | | |
|---|---|---|---|
| 2,228,455 | 1/1941 | Honold | 260—207.1 X |
| 3,016,384 | 1/1962 | Caliezi | 260—314.5 |
| 3,127,412 | 3/1964 | Gaertner et al. | 260—314.5 |
| 3,346,551 | 10/1967 | Anton | 260—152 |

JOSEPH REBOLD, Primary Examiner

C. F. WARREN, Assistant Examiner

U.S. Cl. X.R.

260—208

PO-1050
(5/69)

UNITED STATES PATENT OFFICE
CERTIFICATE OF CORRECTION

Patent No. 3,660,375            Dated May 2, 1972

Inventor(s) KLAUS EHRHARDT, GEORG GEIGER and FRITZ KEHRER

It is certified that error appears in the above-identified patent and that said Letters Patent are hereby corrected as shown below:

Column 1, line 17, "azobenzene" should read --azobenzene,--; line 33, after the formula, insert a comma --,--; line 40, "raidation" should read --radiation--; line 43, "I" should read --(I)--; line 65, "stock, the" should read --stock,--; line 66, "in mass" should read --in the mass--. Column 2, line 10, "I," should read --(I),--; line 52, "180°" should read --180°,--. Claim 1, line 1, "(β" should read --β--; line 2, "pigment)" should read --pigment--.

Signed and sealed this 22nd day of May 1973.

(SEAL)
Attest:

EDWARD M. FLETCHER, JR.
Attesting Officer

ROBERT GOTTSCHALK
Commissioner of Patents